United States Patent
Barriere et al.

(10) Patent No.: US 12,553,186 B2
(45) Date of Patent: Feb. 17, 2026

(54) PROCESS FOR MANUFACTURING PAPER OR CARDBOARD

(71) Applicant: SNF Group, Andrezieux Boutheon (FR)

(72) Inventors: Cyril Barriere, Andrezieux Boutheon (FR); Bastien Martel, Andrezieux Boutheon (FR)

(73) Assignee: SNF Group, Andrezieux Boutheon (FR)

( * ) Notice: Subject to any disclaimer, the term of this patent is extended or adjusted under 35 U.S.C. 154(b) by 259 days.

(21) Appl. No.: 18/258,940

(22) PCT Filed: Dec. 21, 2021

(86) PCT No.: PCT/FR2021/052418
§ 371 (c)(1),
(2) Date: Jun. 22, 2023

(87) PCT Pub. No.: WO2022/136794
PCT Pub. Date: Jun. 30, 2022

(65) Prior Publication Data
US 2024/0044082 A1 Feb. 8, 2024

(30) Foreign Application Priority Data

Dec. 22, 2020 (FR) ...................................... 2013917

(51) Int. Cl.
*D21H 17/37* (2006.01)
*C08F 220/56* (2006.01)
*D21H 21/10* (2006.01)
*D21H 23/04* (2006.01)
*D21J 1/06* (2006.01)

(52) U.S. Cl.
CPC ......... *D21H 17/375* (2013.01); *C08F 220/56* (2013.01); *D21H 21/10* (2013.01); *D21H 23/04* (2013.01); *D21J 1/06* (2013.01); *C08F 2810/00* (2013.01)

(58) Field of Classification Search
CPC ...... D21H 17/375; D21H 21/10; D21H 23/04; C08F 220/56; C08F 2810/00; D21J 1/06
See application file for complete search history.

(56) References Cited

U.S. PATENT DOCUMENTS

| 8,262,859 B2 | 9/2012 | Wright | |
| 2013/0139986 A1* | 6/2013 | Faucher | .......... D21H 17/42 162/168.3 |

FOREIGN PATENT DOCUMENTS

| CN | 106084243 A * | 11/2016 | ......... C04B 24/2652 |
| WO | WO 2000/011046 A1 | 3/2000 | |
| WO | WO 2012/017172 A1 | 2/2012 | |

OTHER PUBLICATIONS

International Search Report and Written Opinion issued PCT/FR2021/052418, dated Apr. 12, 2022.

* cited by examiner

*Primary Examiner* — Abbas Rashid
*Assistant Examiner* — Stephen M Russell
(74) *Attorney, Agent, or Firm* — Knobbe, Martens, Olson & Bear, LLP

(57) ABSTRACT

A process for making a sheet of paper or cardboard from a fiber suspension, includes injection of a polymer P3 into a cellulosic fiber suspension, formation of a sheet of paper or cardboard, and drying of the sheet of paper or cardboard. The P3 polymer is prepared, prior to the injection, from a water-soluble P1 polymer of at least one nonionic monomer, such as acrylamide, methacrylamide, N,N-dimethylacrylamide, and acrylonitrile. The P1 polymer is subjected to a Re1 reaction to give a P2 polymer, which is then subjected to a Re2 reaction to give the P3 polymer, which is injected into the fibrous suspension within 24 hours of the start of the Re1 reaction.

15 Claims, No Drawings

PROCESS FOR MANUFACTURING PAPER OR CARDBOARD

FIELD OF THE INVENTION

This invention relates to a method for manufacturing paper or cardboard with improved drainage and machinability properties. More precisely, the subject-matter of the invention is a method involving the preparation of a polymer resulting from functionalization with isocyanates and addition of compounds comprising at least one aldehyde function prior to its addition to the fibrous suspension used to make the paper or cardboard.

This invention also has as its subject-matter papers and cardboards with improved physical properties obtained by this process.

PRIOR ART

The paper industry is constantly seeking to optimize its manufacturing processes, particularly in terms of yield, productivity, cost reduction, and quality of finished products.

The use of polymers as dry strength, drainability, and machinability agents is widely described.

Drainage properties refer to the ability of the fibrous mat to evacuate or drain as much water as possible before drying. Improved drainage properties mean energy savings and increased production capacity.

Machinability means optimizing the operation of the paper machine by increasing productivity through better drainage on the table, better dryness at the press section, a reduction in breakage through greater circuit cleanliness, and a reduction in deposits.

Polyvinylamines are known to improve drainage during paper formation.

U.S. Pat. No. 8,262,859 describes that the reaction of polyvinylamine with at least one dialdehyde produces a functionalized polyvinylamine that imparts improved wet and/or dry strength to the paper or cardboard. However, this reaction is very fast, difficult to control, and it is carried out in a very diluted medium which requires a significant cost to transport the product from the place of production to the paper manufacturing site. This reaction also causes the reaction medium to freeze. Therefore, this reaction cannot be undertaken directly at the papermaking site just upstream of the injection of the polymer into the cellulosic fiber, at the risk of altering the machinability because of the deposits generated on the paper machine.

DISCLOSURE OF THE INVENTION

Unexpectedly, the Applicant has discovered that a paper process using a polymer resulting, just upstream of its injection into a fibrous suspension (advantageously a cellulosic fiber suspension), from a functionalization with isocyanates and the addition of compounds comprising at least one aldehyde function makes it possible to improve drainage and dry strength properties. Moreover, during this process, no polymer gel formation is observed, which does not alter the machinability.

More precisely, the invention relates to a process for manufacturing a sheet of paper or cardboard from a fibrous suspension (advantageously a suspension of cellulosic fibers), during which a water-soluble P1 polymer that comprises at least one non-ionic monomer selected from acrylamide, methacrylamide N,N-dimethylacrylamide, and acrylonitrile is subjected to an Re1 reaction to give a P2 polymer, which is then subjected to an Re2 reaction to give a P3 polymer, which is injected into the fiber suspension within 24 hours (less than or equal to 24 hours) from the start of the Re1 reaction;

The Re1 reaction consists of adding an alkali and/or alkaline-earth hydroxide and an alkali and/or alkaline-earth hypohalide to the P1 polymer in order to obtain, after 10 seconds to 60 minutes, the P2 polymer functionalized by isocyanates, The Re2 reaction consists of adding a compound functionalized by at least one aldehyde or capable of generating at least one aldehyde function to the P2 polymer in order to obtain the P3 polymer.

In other words, the process for making a sheet of paper or cardboard from a fiber suspension according to the invention comprises the following steps:

a) injection of a P3 polymer into a cellulose fiber suspension,
b) formation of a sheet of paper or cardboard,
c) drying the sheet of paper or cardboard, the P3 polymer being prepared, prior to step a), according to the Re1 to Re2 reactions, from a water-soluble P1 polymer of at least one nonionic monomer selected from acrylamide, methacrylamide, N,N-dimethylacrylamide, and acrylonitrile:

Re1: preparation of a P2 polymer comprising isocyanate functions by reaction for 10 seconds to 60 minutes between (i) an alkali metal hydroxide and/or an alkaline earth metal hydroxide, (ii) an alkali metal hypohalide and/or an alkaline earth metal hypohalide and (iii) the P1 polymer, Re2: preparation of a P3 polymer by reaction between (iv) a compound comprising at least one aldehyde function or a compound which may generate at least one aldehyde function and (v) the P2 polymer comprising isocyanate functions, the P3 polymer being injected into the fiber suspension in step a) within 24 hours of the start of the Re1 reaction.

This process is advantageously devoid of a decarboxylation step (removal of $CO_2$) after the Re1 reaction. Indeed, this would consume the isocyanate functions necessary to carry out the Re2 reaction. The process is advantageously devoid of a decarboxylation step (removal of $CO_2$) after the Re2 reaction, in particular when the Re2 reaction is partial (reaction of part of the isocyanate functions).

In the following description and in the claims, all measurements of polymer expressed in $g \cdot t^{-1}$ or $kg \cdot t^{-1}$ are given as weight of active polymer per ton of dry matter. The dry matter is the dry extract obtained after evaporation of the water from the fibrous suspension used in the manufacturing process of a sheet of paper or cardboard. The dry matter is generally based on cellulosic fibers and fillers, advantageously consisting of cellulosic fibers and fillers. The term "cellulosic fibers" encompasses any cellulosic entity, including fibers, fines, microfibrils or nanofibrils. Fibrous suspension means a thick stock or thin stock that is based on water and cellulosic fibers The Thick Stock, with a dry matter concentration (by weight) of more than 1% or even more than 3%, is upstream of the fan pump. The Thin Stock, with a dry matter concentration weight generally below 1%, is located downstream of the fan pump.

The term "polymer" refers to both homopolymers and copolymers.

An amphoteric polymer is a polymer comprising cationic charges and anionic charges, preferably as many anionic charges as cationic charges.

As used herein, the term "water-soluble polymer" refers to a polymer that yields an aqueous solution without insoluble particles when dissolved under agitation for 4 hours at 25° C. and with a concentration of 20 g·L$^{-1}$ in water.

The value ranges include the lower and upper bounds. Thus, the value ranges "between 0.1 and 1.0" and "from 0.1 to 1" include the values 0.1 and 1.0.

The water-soluble P1 polymer contains at least one non-ionic monomer selected from acrylamide, methacrylamide, N,N-dimethylacrylamide, acrylonitrile. Optionally, it may also contain anionic and/or cationic and/or zwitterionic monomers.

The anionic monomers are preferably selected from the group comprising monomers having a carboxylic acid function and their salts including acrylic acid, methacrylic acid, itaconic acid, maleic acid; monomers having a sulfonic acid function and their salts; including acrylamido tertiary butyl sulfonic acid (ATBS), allyl sulfonic acid and methallyl sulfonic acid, and their salts, and monomers having a phosphonic acid function and their salts.

Generally speaking, the salts of the anionic monomers of the polymers P1 to P5 are salts of an alkali metal, an alkaline earth metal or an ammonium (preferably a quaternary ammonium).

Cationic monomers are preferably selected from the group consisting of quaternized or salified dimethylaminoethyl acrylate (ADAME), quaternized or salified dimethyl aminoethyl methacrylate (MADAME), diallyl dimethyl ammonium chloride (DADMAC), acrylamido propyl trimethyl ammonium chloride (APTAC), and methacryl amido propyl trimethyl ammonium chloride (MAPTAC).

Advantageously, the salts of cationic monomers of polymers P1 to P5 are salts of a halide, preferably chloride.

The zwitterionic monomers are preferably selected from the group consisting of sulfobetaine monomers such as sulfopropyl dimethylammonium ethyl methacrylate, sulfopropyl dimethylammonium propylmethacrylamide, or sulfopropyl 2-vinylpyridinium; phosphobetaine monomers, such as phosphato ethyl trimethylammonium ethyl methacrylate; and carboxybetaine monomers.

Preferably, the water-soluble P1 polymer is non-ionic. In other words, it preferably comprises only non-ionic monomers. Even more preferably, P1 is a homopolymer of acrylamide or methacrylamide.

The P1 Polymer may be linear, structured, or cross-linked. Crosslinking agents for structuring may be selected from sodium allyl sulfonate, sodium methallyl sulfonate, sodium methallyl disulfonate, methylene bisacrylamide, triallylamine, and triallylammonium chloride.

Structuring of the P1 polymer may also be obtained with at least one polyfunctional compound containing at least 3 heteroatoms selected from N, S, O, P and each having at least one mobile hydrogen. In particular, this polyfunctional compound may be a polyethyleneimine or a polyamine.

The P1 polymer has a weight average molecular weight advantageously between 100,000 and 20 million, preferably between 250,000 and 5 million daltons.

According to this invention, the weight average molecular weight of the P1 polymer is determined by measuring the intrinsic viscosity. Intrinsic viscosity may be measured by methods known to the person skilled in the art and may in particular be calculated from the reduced viscosity values for different concentrations by a graphical method consisting of plotting the reduced viscosity values (on the y-axis) as a function of the concentrations (on the x-axis) and extrapolating the curve to zero concentration. The intrinsic viscosity value is read on the y-axis or using the least squares method.

Then, the weight-average molecular weight may be determined by the famous Mark-Houwink equation:

$$[\eta]=KM^\alpha$$

[η] represents the intrinsic viscosity of the polymer determined by the solution viscosity measurement method, K represents an empirical constant, M represents the molecular weight of the polymer, α represents the Mark-Houwink coefficient α and K depend on the particular polymer-solvent system. Tables known to the person skilled in the art give the values of α and K according to the polymer-solvent system.

The Re1 reaction consists in adding (i) an alkali hydroxide and/or an alkaline earth hydroxide and (ii) an alkali hypohalide and/or an alkaline earth hypohalide (iii) to the P1 polymer in order to obtain the isocyanate-functionalized P2 polymer.

Advantageously, the alkali hydroxide is soda (sodium hydroxide) and the alkali hypohalide is sodium hypochlorite.

The Re1 reaction is advantageously carried out on the P1 polymer at a mass concentration of P1 polymer of between 0.5 and 20% in aqueous solution, preferably between 1 and 10%.

Preferably, for the Re1 reaction, the coefficient Alpha=moles of hypohalide (alkali and/or alkaline earth)/moles of nonionic monomer(s) of the P1 polymer is between 0.1 and 1.0 and the coefficient Beta=moles of hydroxide (alkali and/or alkaline earth)/moles of hypohalide (alkali and/or alkaline earth) is between 0.5 and 4.0.

The Alpha coefficient is used to determine the amount of isocyanate functionality formed during the Re1 reaction from the non-ionic monomers of the P1 polymer (acrylamide, methacrylamide, N,N-dimethylacrylamide and acrylonitrile). It is not the Mark-Houwink coefficient denoted α.

The Re1 reaction is advantageously carried out at a temperature between 30° C. and 60° C.

Thus, according to a particular embodiment, the Re1 reaction may be carried out from an aqueous solution having a mass concentration of polymer P1 of between 0.5 and 20%, at a temperature of between 30° C. and 60° C. and in the presence of an Alpha coefficient of between 0.1 and 1.0, the Alpha coefficient being the ratio of the number of moles of hypo-halide to the number of moles of non-ionic monomer of polymer P1.

The Re2 reaction consists of adding a compound comprising at least one aldehyde function or a compound capable of generating at least one aldehyde function to the polymer P2 in order to obtain the polymer P3.

The Re2 reaction is advantageously carried out on the P2 polymer at a mass concentration of polymer P2 of between 0.5 and 20% in aqueous solution, preferably between 1 and 5%.

Advantageously, the Re2 reaction takes place by direct addition of the compound comprising at least one aldehyde function or of the compound capable of generating at least one aldehyde function into the reaction medium (aqueous solution) resulting from the Re1 reaction.

The Re2 reaction is advantageously carried out at a temperature between 10° C. and 60° C., preferably between 20 and 40° C.

Without wishing to be limited by any theory, it would seem that, during the Re2 reaction, the isocyanate functions of the P2 polymer react with the aldehyde functions, for example to form imine functions of the —N=C(HR$^1$) type.

The compound comprising at least one aldehyde function has a molecular weight advantageously less than or equal to 200 g·mol$^{-1}$.

Preferably, the compound comprising at least one aldehyde function is selected from glyoxal, glutaraldehyde, furan dialdehyde, 2-hydroxyadipaldehyde, succinaldehyde, starch dialdehyde, 2,2-dimethoxyethanal and combinations thereof. Even more preferably, the compound comprising at least one aldehyde function is glyoxal.

The compound which may generate at least one aldehyde function has a molecular weight advantageously less than or equal to 500,000 g·mol$^{-1}$, more advantageously less than or equal to 100,000 g·mol$^{-1}$, for example less than or equal to 50,000 g·mol$^{-1}$. It has a molecular weight advantageously greater than or equal to 500 g·mol$^{-1}$, for example greater than or equal to 1000 g·mol$^{-1}$.

According to one embodiment, the compound that can generate at least one aldehyde function is a polyepoxide, for example polyethylene glycol diepoxide or polyethylene glycol triepoxide. In this case, it is a precursor of a compound comprising at least one aldehyde function.

According to another embodiment, the compound that is able to generate at least one aldehyde function is preferably a nonionic, cationic, anionic, or amphoteric P5 polymer derived from the reaction between at least one compound comprising at least one aldehyde function and at least one P4 base polymer of at least one nonionic monomer chosen from acrylamide, methacrylamide, N,N-dimethylacrylamide, and acrylonitrile.

The base polymer P4 may be non-ionic, cationic, or anionic or amphoteric. It is advantageously water-soluble.

Polymer P4 may be comprised of a cationic monomer which is preferably selected from the group consisting of quaternized or salified dimethylaminoethyl acrylate (ADAME), quaternized or salified dimethylaminoethyl methacrylate (MADAME), dimethyldiallylammonium chloride (DADMAC), acrylamidopropyltrimethylammonium chloride (APTAC), and methacrylamidopropyltrimethylammonium chloride (MAPTAC).

Polymer P4 may comprise an anionic monomer which is preferably selected from 2-acrylamido-2-methylpropane sulfonic acid, acrylic acid, methacrylic acid, itaconic acid, and/or salts thereof.

The compound comprising at least one aldehyde function reacting on P4 to give P5 is advantageously chosen from glyoxal, glutaraldehyde, furan dialdehyde, 2-hydroxyadipaldehyde, succinaldehyde, starch dialdehyde, 2,2-dimethoxyethanal and combinations thereof. Even more preferably, the compound comprising at least one aldehyde function is glyoxal.

The P5 polymer has a molecular weight advantageously between 100,000 g·mol$^{-1}$ and 2,000,000 g·mol$^{-1}$, for example between 120,000 g·mol$^{-1}$ and 1,000,000 g·mol$^{-1}$.

According to a preferred embodiment, polymer P5 is obtained by reacting a compound comprising at least one aldehyde function and at least one base polymer P4 within a maximum of 12 hours before being added to polymer P2. This is the time between the start of the reaction and the addition to P2.

Preferably, for reaction Re2 of the process of the invention, between 2 and 50%, and more preferably between 5 and 30%, of compound comprising at least one aldehyde function or of compound capable of generating at least one aldehyde function are added to the P2 polymer, the percentages being expressed by weight with respect to the weight of polymer P2.

Thus, some or all of the isocyanate functions of the P2 polymer may be functionalized.

According to a particular embodiment, an excess of compound comprising at least one aldehyde function or compound capable of generating at least one aldehyde function may be added. In this case, during the Re2 reaction, the molar amount of aldehyde functions is higher than that of the isocyanate functions.

The P3 polymer is advantageously used immediately after the Re2 reaction, without purification.

In a preferred embodiment, the polymer P3 is introduced into the white water and/or the thick stock and/or the mixture formed by the white water and the thick stock after homogenization of the fiber suspension in the fan pump.

Advantageously, the P3 polymer may also be introduced into the paper process at the forming table or size press, for example by spraying.

Between 0.25 and 15 kg·t$^{-1}$, and preferably between 0.5 and 5 kg·t$^{-1}$ of polymer P3 are added to the fibrous suspension.

The fibrous suspension includes the possible use of different cellulosic fibers: virgin fibers, recycled fibers, chemical stock, mechanical stock, micro-fibrillated cellulose, or nano-fibrillated cellulose. The fibrous suspension also includes the use of these different cellulosic fibers with all types of fillers such as $TiO_2$, $CaCO_3$ (ground or precipitated), kaolin, organic fillers, and their mixtures.

The P3 polymer may be used in the paper process in combination with other products such as mineral or organic coagulants, dry strength agents, wet strength agents, natural polymers such as starches or carboxymethyl cellulose (CMC), inorganic microparticles such as bentonite microparticles, and colloidal silica microparticles, organic polymers of any ionic (non-ionic, cationic, anionic, or amphoteric) nature and which may be (without being limiting) linear, branched, cross-linked, hydrophobic, or associative.

The following examples illustrate the invention without limiting its scope.

EXAMPLES OF EMBODIMENTS OF THE INVENTION

Procedures Used in the Application Tests:
a) Types of Stock Used
Virgin Fiber Stock:
The wet stock is obtained by disintegrating the dry stock to obtain a final aqueous concentration of 1% by weight. It is a neutral pH stock composed of 90% bleached virgin long fibers, 10% bleached virgin short fibers, and 30% additional GCC (Hydrocal® 55 from Omya) by weight of the fibers.
Recycled Fiber Stock:
The wet stock is obtained by disintegrating the dry stock to obtain a final aqueous concentration of 1% by weight. It is a pH-neutral stock made from 100% recycled cardboard fibers.
b) Evaluation of Drainage Performance (DDA)
The DDA ("Dynamic Drainage Analyzer") automatically determines the time (in seconds) required to vacuum drain a fibrous suspension. The polymers are added to the wet stock (0.6 liter of stock at 1.0 wt %) in the DDA cylinder under agitation at 1,000 rpm:
  T=0 s: Agitation of the stock
  T=20 s: Addition of the polymer
  T=30 s: stop agitation and vacuum drain at 200 mbar (1 bar=$10^5$ Pa) for 70 seconds.

The pressure under the fabric is recorded as a function of time. When all the water is evacuated from the fibrous mats, the air passes through it causing a break to appear in the slope on the curve representing the pressure under the fabric as a function of time. The time, expressed in seconds, taken when the slope breaks, corresponds to the drain time. The shorter the time, the better the vacuum drainage.

c) Performance in DSR Application (Dry Strength), Weight at 90 g·m$^{-2}$.

The necessary quantity of stock is taken in order to obtain a sheet with a weight of 90 g·m$^{-2}$.

The wet stock is introduced into the vat of the dynamic formette and is kept under agitation. The different components of the system are injected into this stock according to the predefined sequence. A contact time of 30 to 45 seconds between each addition of polymer is generally observed.

Paper formettes are made with an automatic dynamic formette: a blotter and the forming fabric are placed in the bowl of the dynamic formette before starting the rotation of the bowl at 1000 rpm and building the water wall. The treated stock is spread over the water wall to form the fibrous mat on the forming fabric.

Once the water is drained, the fibrous mat is recovered, pressed under a press delivering 4 bar, then dried at 117° C. The resulting sheet is conditioned overnight in a room with controlled humidity and temperature (50% relative humidity and 23° C.). The dry strength properties of all sheets obtained by this procedure are then measured.

The burst is measured with a Messmer Buchel M 405 burst meter according to TAPPI T403 om-02. The result is expressed in kPa. The bursting index, expressed in kPa·m$^2$/g, is determined by dividing this value by the weight of the sheet tested.

The dry breaking length is measured in the machine direction with a Testometric AX tensile tester according to TAPPI T494 om-01. The result is expressed in km.

Products Tested in the Application Tests:

P1 Polymer

In a 1 liter reactor equipped with a mechanical stirrer, a thermometer, a refrigerant, and a nitrogen gas immersion tube, 310 g of water are introduced. The pH of the reaction medium is adjusted to 3.3 using a pH buffer (NaOH 30% by weight in water and H$_3$PO$_4$ 75% by weight in water). The medium is heated and maintained at a temperature between 79 and 81° C. using a water bath. Using two continuous pours, 400 g of 50% acrylamide in water, 0.28 g of 100% N,N-methylene-bis-acrylamide, 237.8 g of water and 2.40 g of 100% sodium methallyl sulfonateare incorporated (pour 1) for 180 minutes. Pour 2, 0.48 g of 100% sodium persulfate and 48 g of water are incorporated for 180 minutes. The polymer is left at 80° C. for 120 minutes after the end of the pouring process.

The resulting polymer solution P1 has a pH of 5.7, a polymer weight concentration of 20% and a viscosity of 6000 cps.

P2 Polymers

Preparation of a 10% by weight solution of P1 in water by diluting 20 g of a 20% by weight solution of P1 in water with 20 g of water. The polymer solution is heated to 50° C.

A mixture of 14.6% sodium hypochlorite (by weight in water) and 30% soda ash (by weight in water) is prepared based on the alpha and beta coefficients for the Re1 reaction. When the P1 polymer solution is at 50° C., the mixture of sodium hypochlorite and soda is added to P1. After 30 seconds of reaction, water is added. The result is the P2 polymer (Table 1: list of P2 polymers).

TABLE 1

| | P2 polymers | | | | |
|---|---|---|---|---|---|
| | Alpha Coefficient | Beta Coefficient | Sodium Hypochlorite | Soda | Water |
| P2-A | 0.35 | 2 | 10.05 | 5.25 | 144.70 |
| P2-B | 0.5 | 2 | 14.35 | 7.5 | 138.15 |
| P2-C | 0.7 | 2 | 20.10 | 10.50 | 129.40 |
| P2-D | 0.05 | 2 | 1.44 | 0.75 | 157.81 |
| P2-E | 0.35 | 6 | 10.05 | 15.75 | 134.20 |

P3 Polymers 3 minutes after obtaining the P2polymers, 1.7 g of glyoxal (40% by weight in water) is added to perform the Re2 reaction, which is 17% by weight based on the polymer. The P3-A1, P3-B1 and P3-C1 polymers are obtained.

3 minutes after polymer P2-B is obtained, 6.5 g of polymer P5 and 25 g of water are added to perform the Re2 reaction, which is 11% by weight based on the polymer. Polymer P3-B3 is obtained.

3 minutes after obtaining the P2 polymers, the pH is adjusted to 10 and 0.67 g of glycerol triglycidyl ether (GE-100) and is added to perform the Re2 reaction, which is 17% by weight based on the polymer. The P3-A5 and P3-B5 polymers are obtained.

3 minutes after the P2 polymers are obtained, the pH is adjusted to 10 and 0.67 g of Pentaerythritol tetraglycidyl ether (GE-500) and is added to perform the Re2 reaction, which is 17% by weight based on the polymer. The P3-A6 and P3-B6 polymers are obtained.

P4 Polymer

In a 1 liter reactor equipped with a mechanical stirrer, a thermometer, a refrigerator, and a nitrogen gas immersion tube, 153 g of water, 67 g of 64% diallyldimethylammonium chloride and 5.0 g of sodium hypophosphite are introduced. The pH of the reaction medium is adjusted to 2.5 using 96% sulfuric acid. The medium is heated and maintained at a temperature between 79 and 81° C. using a water bath. By means of two continuous pours, 715 g of 50% by weight acrylamide is incorporated in water for 135 minutes (pour 1). Pour 2, 4.0 g of 100% sodium persulfate and 56 g of water are incorporated for 160 minutes. The polymer is left at 80° C. for 30 minutes after the end of the pouring process. 1 g of 40% sodium bisulfite (by weight in water) is added before aging for 60 minutes at 80° C.

The resulting P4 polymer solution has a pH of 5.2, a concentration of 40% by weight and a viscosity of 2300 cps.

P5 Polymer

In a stirred 1000 ml reactor, 211 g of P4 polymer and 745 g of deionized water are introduced. The reactor is equipped with a pH measurement probe. After 10 minutes of agitation, the pH is adjusted to 11.2 with a 30% soda solution by weight in water. The temperature is maintained between 19 to 26° C.

42 g of glyoxal at 40% by weight in water are added. A control of the pH and a follow-up of the viscosity allow a product of 20 cps (viscosity of end of reaction) to be obtained. When this viscosity is reached, the reaction is stopped by lowering the pH to less than 3.5 by adding 92% H$_2$SO$_4$ by weight in water. The final viscosity and pH are recorded. The P5 polymer is obtained at a concentration of 7.5% by weight.

For all viscosity measurements, the viscometer is a Brookfield type, with a LV1 modulus and a speed of 60 rpm.

P3-CE Polymer (Counter Examples)
- 3 minutes after the P2-D polymer is obtained, 1.7 g of Glyoxal (40% by weight in water) is added to perform the Re2 reaction, which is 17% by weight based on the polymer. The P3-CE-1 polymer is obtained. It is not stable and forms a solid gel.
- 3 minutes after the P2-E polymer is obtained, 1.7 g of Glyoxal (40% by weight in water) is added to perform the Re2 reaction, which is 17% by weight based on the polymer. The P3-CE-2 Polymer is obtained.

Application Testing

Drainage Performance (DDA)

Observation: The tests are carried out by series; a blank is redone each time.

Series 1

TABLE 2

Drainage according to the P2 or P3 polymer

|  | Alpha | Drainage(s) 1.7 kg/T | 3.4 kg/T |
|---|---|---|---|
| P2-A | 0.35 | 17.46 | 14.46 |
| P2-B | 0.5 | 16.16 | 13.05 |
| P2-C | 0.7 | 15.88 | 12.88 |
| P3-A-1 | 0.35 | 16.01 | 12.00 |
| P3-B-1 | 0.5 | 14.58 | 10.89 |
| P3-C-1 | 0.7 | 14.11 | 11.09 |
| Blank |  | 29.29 |  |

An improvement in the draining is observed with the increase of the alpha coefficient. P3 polymers show improved performance over P2 polymers for the same alpha coefficient. This demonstrates the benefit generated by the Re2 reaction.

Series 2

TABLE 3

Drainage according to the polymer

|  | Alpha | Drainage(s) 1.7 kg/T | 3.4 kg/T |
|---|---|---|---|
| P2-B | 0.5 | 18.34 | 13.03 |
| P3-B-1 | 0.5 | 16.87 | 12.51 |
| P3 B-3 | 0.5 | 17.52 | 12.73 |
| P5 | / | 32.65 | 35.11 |
| CE-3 | 0.5 | 21.69 | 15.04 |
| Blank |  | 34.4 |  |

CE-3: simultaneous addition of a P2 polymer and a P5 polymer without prior mixing in the paper stock during the drainage sequence.

The glyoxalated P5 polymer alone is not of interest in drainage. An improvement in drainage is observed with P3 polymers compared to a P2 polymer. The addition of polymer P5 during the Re2 reaction on polymer P2 results in a better performing polymer.

Series 3

TABLE 4

Drainage according to the polymer

|  | Alpha | Drainage(s) 1.7 kg/T | 3.4 kg/T |
|---|---|---|---|
| P2-A | 0.35 | 24.29 | 18.61 |
| P3-A-5 | 0.35 | 18.17 | 12.54 |

TABLE 4-continued

Drainage according to the polymer

|  | Alpha | Drainage(s) 1.7 kg/T | 3.4 kg/T |
|---|---|---|---|
| P3-A-6 | 0.35 | 18.73 | 12.66 |
| P2-B | 0.5 | 20.88 | 14.77 |
| P3-B-5 | 0.5 | 17.88 | 12.34 |
| P3-B-6 | 0.5 | 17.25 | 11.95 |
| Blank |  | 34.25 |  |

An improvement in drainage is observed with the P3 polymers resulting from the addition of an epoxide on the P2 polymer, during the Re2 reaction.

Series 4

TABLE 5

Drainage according to the polymer

|  | Alpha/Beta | 1.7 kg/T | Drainage(s) 1.7 kg/T + 0.6 kg/T PA | 3.4 kg/T |
|---|---|---|---|---|
| P2-B | 0.5/2 | 17.06 | 12.05 | 13.2 |
| P3-B-1 | 0.5/2 | 16.6 | 11.83 | 12.09 |
| P3-CE-1 | 0.05/2 |  | Gel |  |
| P3-CE-2 | 0.5/6 | 21.31 | 16.82 | 16.04 |
| Blank |  |  | 32.97 |  |

PA: Copolymer of acrylamide and acrylic acid (70/30, mol %) in aqueous dispersion The polymer of the invention added with an anionic PA polymer generates an improvement in drainage. The P3-CE-2 polymer with a beta coefficient greater than 4 does not provide DDA performance. The P3-CE-1 polymer with an alpha coefficient of 0.05 is not usable.

Series 5

TABLE 6

Drainage according to polymer

|  | Alpha | Drainage(s) 1.7 kg/T |
|---|---|---|
| P2-B | 0.5 | 17.53 |
| P3-B-1 | 0.5 | 16.25 |
| CE-5-3 |  | 18.88 |
| CE-6-5 |  | 27.62 |
| Blank |  | 33.26 |

CE-5-3 and CE-6-5 are from U.S. Pat. No. 8,262,859 (examples 3 and 5) The glyoxalated CE-5-3 and CE-6-5 polyvinylamines show poorer drainage performance than the P3 polymer.

Performance in DSR Application (Dry Strength)

Stock with pH 6.5

TABLE 7

Dry strength as a function of polymer

|  | % Burst Index | % DBL SM | % DBL ST |
|---|---|---|---|
| Blank | Ref | Ref | Ref |
| P2-B | 15% | 9% | 14% |
| P3-B-1 | 18% | 12% | 26% |

TABLE 7-continued

Dry strength as a function of polymer

| | % Burst Index | % DBL SM | % DBL ST |
|---|---|---|---|
| P3-B-5 | 19% | 10% | 18% |
| P3-B-6 | 19% | 17% | 18% |
| CE-5-3 | 9% | 9% | 19% |
| CE-6-5 | 2% | 4% | 9% |

Burst performance is improved by the use of the P3 polymer compared to P2 polymers and CE counterparts. The same trend is observed for the measurement of break length in the forward direction (DBL SM) and in the cross direction (DBL ST).

What is claimed is:

1. A method for producing a sheet of paper or cardboard from a fibrous suspension, comprising:
   a) injecting a polymer P3 into a cellulose fiber suspension,
   b) forming a sheet of paper or cardboard,
   c) drying the sheet of paper or cardboard,
   wherein the polymer P3 is prepared, prior to said a), from a water-soluble polymer P1 of at least one nonionic monomer selected from the group consisting of acrylamide, methacrylamide, N,N-dimethylacrylamide, and acrylonitrile,
   wherein the P1 polymer is subjected to a Re1 reaction to give a P2 polymer, which is then subjected to a Re2 reaction to give the P3 polymer, which is injected into the fibrous suspension within 24 hours of the start of the Re1 reaction;
   wherein the Re1 reaction consists of preparing a P2 polymer comprising isocyanate functions by reaction for 10 seconds to 60 minutes between (i) an alkali hydroxide and/or an alkaline-earth hydroxide, (ii) an alkali hypohalide and/or an alkaline-earth hypohalide and (iii) the polymer P1,
   wherein the Re2 reaction consists of preparing a P3 polymer by reaction between (iv) a compound which is capable of generating at least one aldehyde function to the P2 polymer, and (v) the P2 polymer comprising isocyanate functions,
   wherein the method is free of any decarboxylation step after said Re1 and Re2 reactions.

2. The method according to claim 1, wherein the P1 polymer is non-ionic.

3. The method according to claim 1, wherein the P1 polymer is an acrylamide or methacrylamide homopolymer.

4. The method according to claim 1, wherein, for the Re1 reaction, a coefficient Alpha=moles of hypohalide/moles of non-ionic monomer of the water-soluble polymer P1 is between 0.1 and 1.0 and a coefficient Beta=moles of hydroxide/moles of hypohalide is between 0.5 and 4.0.

5. The method according to claim 1, wherein, for the Re2 reaction, the compound comprising at least one aldehyde function is selected from the group consisting of glyoxal, glutaraldehyde, furan-dialdehyde, 2-hydroxyadipaldehyde, succinaldehyde, starch dialdehyde, 2,2-dimethoxyethanal, and combinations thereof.

6. The method according to claim 1, wherein, for the Re2 reaction, the compound comprising at least one aldehyde function is glyoxal.

7. The method according to claim 1, wherein for the Re2 reaction, the compound that can generate at least one aldehyde function is a polyepoxide.

8. The method according to claim 1, wherein, for the Re2 reaction, the compound which can generate at least one aldehyde function is a nonionic, cationic, anionic, or amphoteric P5 polymer resulting from the reaction between a compound comprising at least one aldehyde function and at least one base polymer P4 comprising at least one nonionic monomer chosen from acrylamide, methacrylamide, N,N-dimethylacrylamide, and acrylonitrile.

9. The method according to claim 8, wherein the base polymer P4 further comprises a cationic monomer selected from the group consisting of quaternized or salified dimethylaminoethyl acrylate (ADAME), quaternized or salified dimethylaminoethyl methacrylate (MADAME), dimethyldiallylammonium chloride (DADMAC), acrylamidopropyltrimethylammonium chloride (APTAC), and methacrylamidopropyltrimethylammonium chloride (MAPTAC).

10. The method according to claim 8, wherein the base polymer P4 further comprises an anionic monomer of the selected from 2-acrylamido-2-methylpropane sulfonic acid, acrylic acid, methacrylic acid, itaconic acid, and/or salts thereof.

11. The method according to claim 8, wherein the P5 polymer is obtained by reaction between a compound comprising at least one aldehyde function and at least one base polymer P4 within a maximum of 12 hours before being added to the P2 polymer.

12. The method according to claim 1, wherein, for the Re2 reaction, between 2% and 50% of compound comprising at least one aldehyde function or of compound capable of generating at least one aldehyde function is added to the P2 polymer, % by weight with respect to the weight of the P2 polymer.

13. The method according to claim 1, wherein the P3 polymer is introduced into a white water and/or into a thick stock and/or into the mixture formed by the white water and the thick stock after homogenization of the fibrous suspension in the fan pump.

14. The method according to claim 1, wherein the P1 polymer has a weight average molecular weight between 100,000 and 20 million daltons.

15. The method according to claim 1, wherein:
   the Re1 reaction is carried out from an aqueous solution having a mass concentration of polymer P1 of between 0.5 and 20%, at a temperature of between 30° C. and 60° C. and in the presence of an Alpha coefficient of between 0.1 and 1.0, the Alpha coefficient being the ratio between the number of moles of hypohalide and the number of moles of nonionic monomer of polymer P1;
   the Re2 reaction is carried out in the presence of the P2 polymer and from 10 to 100% of compound comprising at least one aldehyde function or of compound capable of generating at least one aldehyde function, by weight relative to the P2 polymer.

* * * * *